US012544946B2

(12) United States Patent
Duff, Jr. et al.

(10) Patent No.: US 12,544,946 B2
(45) Date of Patent: Feb. 10, 2026

(54) METHOD OF TREATING RAZOR BLADE CUTTING EDGES

(71) Applicant: The Gillette Company LLC, Boston, MA (US)

(72) Inventors: Ronald Richard Duff, Jr., Shrewsbury, MA (US); John Joseph Nisby, Hanson, MA (US)

(73) Assignee: The Gillette Company LLC, Boston, MA (US)

( * ) Notice: Subject to any disclaimer, the term of this patent is extended or adjusted under 35 U.S.C. 154(b) by 226 days.

(21) Appl. No.: 18/230,741

(22) Filed: Aug. 7, 2023

(65) Prior Publication Data

US 2024/0051167 A1 Feb. 15, 2024

Related U.S. Application Data

(60) Provisional application No. 63/396,756, filed on Aug. 10, 2022.

(51) Int. Cl.

*B26B 21/60* (2006.01)
*B05D 3/00* (2006.01)
*B05D 3/02* (2006.01)
*B05D 5/08* (2006.01)

(52) U.S. Cl.

CPC .............. *B26B 21/60* (2013.01); *B05D 3/007* (2013.01); *B05D 3/0254* (2013.01); *B05D 5/083* (2013.01)

(58) Field of Classification Search

CPC ...... B26B 21/60; B05D 3/007; B05D 3/0254; B05D 5/083

See application file for complete search history.

(56) References Cited

U.S. PATENT DOCUMENTS 3,071,856 A 1/1963 Fischbein
3,508,957 A 4/1970 Blochl
3,518,110 A 6/1970 Fischbein
5,645,894 A * 7/1997 Trankiem ................ B26B 21/60 427/195
5,985,459 A * 11/1999 Kwiecien ................ B26B 21/60 76/DIG. 8

(Continued)

FOREIGN PATENT DOCUMENTS

WO 2022049058 A1 3/2022

OTHER PUBLICATIONS

All Office Actions; U.S. Appl. No. 18/230,771, filed Aug. 7, 2023.

(Continued)

*Primary Examiner* — Omar Flores Sanchez
(74) *Attorney, Agent, or Firm* — Andrés Velarde

(57) ABSTRACT

A method of manufacturing a razor blade cutting edge, the method including: applying a single coating of a polymer material to the razor blade cutting edge to form a coated blade edge; selecting a temperature profile, where the temperature profile has a temperature and a time, and wherein the temperature profile is selected based on a composition of the razor blade cutting edge; heating the coated blade edge at the temperature and for the time indicated by the selected temperature profile to adhere the polymer material to the razor blade cutting edge; and optionally treating the coated blade edge with a solvent or a mechanical process to partially remove the coating.

10 Claims, 11 Drawing Sheets

(56) References Cited

U.S. PATENT DOCUMENTS

| | | | | |
|---|---|---|---|---|
| 6,684,513 | B1 | 2/2004 | Clipstone et al. | |
| 10,011,030 | B1 | 7/2018 | Slattery et al. | |
| 10,315,319 | B2 | 6/2019 | Wang et al. | |
| 11,318,633 | B2 * | 5/2022 | Pandis | B05D 3/007 |
| 11,338,321 | B2 * | 5/2022 | Yu | B05D 3/0254 |
| 11,654,588 | B2 * | 5/2023 | Nisby | B26B 21/60 30/32 |
| 2005/0155460 | A1 * | 7/2005 | Trankiem | C09D 7/48 76/104.1 |
| 2010/0178493 | A1 | 7/2010 | Wang et al. | |
| 2010/0178515 | A1 | 7/2010 | Wang et al. | |
| 2014/0090257 | A1 * | 4/2014 | Wang | B26B 21/60 30/346.5 |
| 2016/0001456 | A1 * | 1/2016 | Duff, Jr. | B05D 1/02 30/346.53 |
| 2016/0096281 | A1 | 4/2016 | Hejmowski et al. | |
| 2018/0229384 | A1 | 8/2018 | Chadwick et al. | |
| 2018/0230320 | A1 | 8/2018 | Chadwick et al. | |
| 2020/0368928 | A1 | 11/2020 | Park et al. | |
| 2022/0134588 | A1 | 5/2022 | Zhuk et al. | |
| 2023/0323523 | A1 * | 10/2023 | Pandis | B05D 5/083 427/255.6 |
| 2024/0051167 | A1 * | 2/2024 | Duff, Jr. | B05D 3/0209 |
| 2024/0051168 | A1 * | 2/2024 | Duff, Jr. | B05D 3/0209 |
| 2024/0051169 | A1 * | 2/2024 | Duff, Jr. | B26B 21/60 |
| 2024/0051170 | A1 * | 2/2024 | Duff, Jr. | B05D 3/0209 |

OTHER PUBLICATIONS

PCT Search Report and Written Opinion for PCT/US2023/071964 dated Dec. 4, 2023, 13 pages.

All Office Actions; U.S. Appl. No. 18/230,759, filed Aug. 7, 2023.

All Office Actions; U.S. Appl. No. 18/230,778, filed Aug. 7, 2023.

U.S. Appl. No. 18/230,759, filed Aug. 7, 2023, to Ronald Richard Duff JR. et. al.

U.S. Appl. No. 18/230,771, filed Aug. 7, 2023, to Ronald Richard Duff JR. et. al.

U.S. Appl. No. 18/230,778, filed Aug. 7, 2023, to Ronald Richard Duff JR. et. al.

* cited by examiner

METHOD OF TREATING RAZOR BLADE CUTTING EDGES

FIELD OF THE INVENTION

The disclosure generally relates to the process of manufacturing treated razor blades, and more particularly to an improved sintering process.

BACKGROUND OF THE INVENTION

It is generally known that razor blades can be coated with polyfluorocarbon to prevent discomfort and pain during shaving. Current methods for coating razor blades involve applying a dispersion of polyfluorocarbon and then sintering the polyfluorocarbon polymer to the blades. Methods for coating razor blades are described in U.S. Pat. Nos. 9,393,588 and 10,118,304.

During the sintering process, the time duration at the target temperature is critical because it drives the bonding of the polymer and the hard coating outer layer of the blades. Most methods currently only have the blades at the target temperature for a short period of time. While some methods do increase the time duration at the target temperature, these processes are labor and equipment intensive. For example, one method to increase the time at temperature includes repeating the steps of applying the polyfluorocarbon and sintering.

Thus, there is a need for an improved, effective method to increase the time at temperature without increasing the processing time of the razor blades.

SUMMARY OF THE INVENTION

In accordance with the present disclosure, a method of manufacturing a razor blade cutting edge is provided, the method including: applying a single coating of a polymer material to the razor blade cutting edge to form a coated blade edge; selecting a temperature profile, wherein the temperature profile comprises at least one temperature and at least one time, and wherein the temperature profile is selected based on a composition of the razor blade cutting edge; heating the coated blade edge at the temperature and for the time indicated by the selected temperature profile to adhere the polymer material to the razor blade cutting edge; and optionally treating the coated blade edge with a solvent or a mechanical process to partially remove the coating.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

DETAILED DESCRIPTION OF THE INVENTION

Definition of Terms

As used herein, the term "razor blade cutting edge" includes a cutting point or ultimate blade tip and one or more facets of a razor blade. An entire blade edge could be coated in the manner described herein; however; an enveloping coat of the type herein is not believed to be essential to the present disclosure. Razor blades according to the present disclosure include all types known in the art. For example, stainless steel blades are commonly used. Many other commercial razor blades also include a chromium or a chromium/platinum layer between the steel blade and the polymer. Other layers may also be feasible and are known in the art. A chromium layer is typically sputtered onto a blade edge surface prior to polymer coating. Furthermore, a similar process may be used to coat the blade with other materials, for instance, but not limited to, a Diamond Like Carbon (DLC) material coating as described in U.S. Pat. Nos. 5,142,785 and 5,232,568, prior to an outer polymer coating.

The term "composition of the razor blade cutting edge" generally refers to the substrate material, sharpened profile of the edge, and any coatings applied to the cutting edge.

A "uniform" coating or the "uniformity" of a coating, as used herein, signifies that the coating provides substantially full coverage with a generally consistent average depth and/or substantially even profile throughout.

An "average molecular weight," as used herein, generally refers to a number average molecular weight of a polymer used to produce a polymer coating. It is equal to the total weight of all the polymer molecules in a representative sample, divided by the total number of polymer molecules in the representative sample. The term "molecular weight distribution" as used herein refers to the distribution of molecular weights that produces the number average molecular weight of a representative sample. As one of skill in the art may recognize, an average molecular weight may be the same between two materials, but their respective molecular weight distributions may be quite different.

The portion of the polymer coating that is removed may generally be referred to as being "non-adherent" soluble polymer molecules of the coating.

Methods of Manufacturing Razor Blade Cutting Edges

Figure 1A:
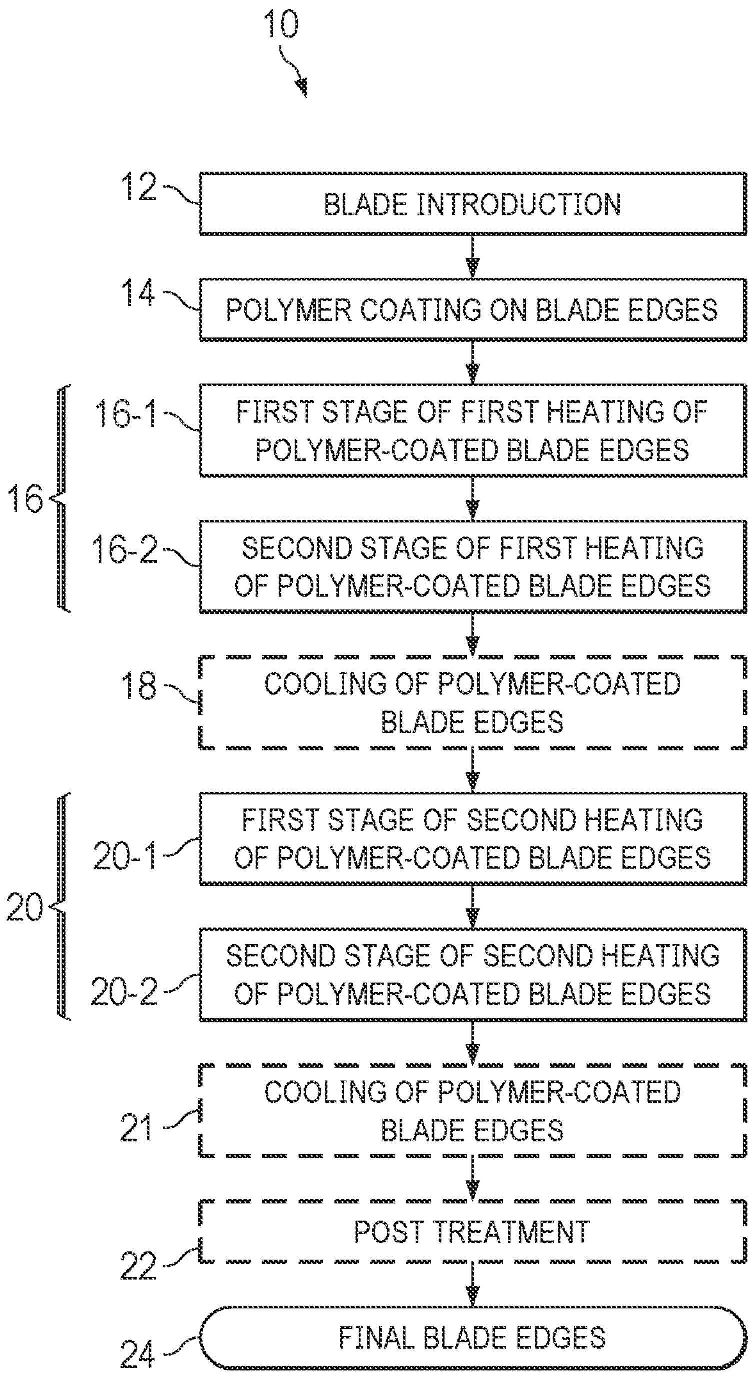
FIG. 1A is a schematic flow diagram of a process of manufacturing a razor blade cutting edge in accordance with the present disclosure.
Figure 1B:
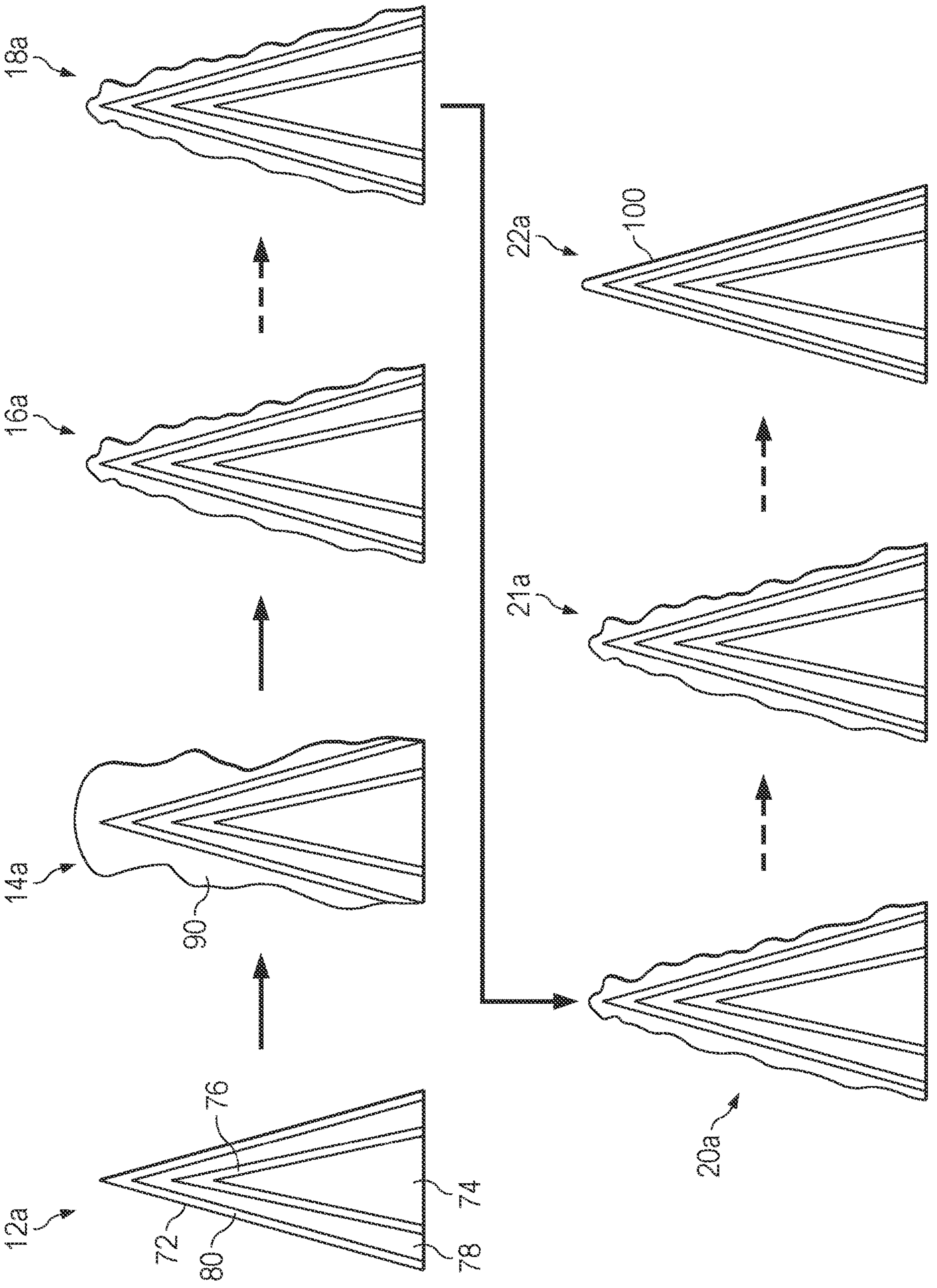
FIG. 1B is a graphical depiction of the blade cutting edges after each step of the flow diagram of FIG. 1A is performed.

FIGS. 1A and 1B are flow diagrams of an exemplary method 10 of manufacturing a razor blade cutting edge involving two dual-stage heating steps. The method 10 may begin with introduction 12 of a razor blade cutting edge 72.

As shown in FIG. 1B, the razor blade cutting edge 72 has a blade edge 12*a*, which may optionally comprise one or more prior coatings deposited thereon. The blade edge 12*a* as shown may comprise a substrate 74, an interlayer 76, a hard coating 78, and an overcoat layer 80. The razor blade cutting edge 72 may be formed with, for example, a stainless steel substrate 74, a niobium interlayer 76, a diamond or DLC hard coating layer 78, and a chromium-containing overcoat layer 80, and any of the layers may include (i) diamond, amorphous diamond, or DLC; or (ii) chromium, platinum, boron, chromium diboride, titanium, titanium diboride, vanadium, aluminum, silicon, tin, tantalum, zirconium, niobium, magnesium, manganese, iron, cobalt, copper, silver, zinc, hafnium, tungsten, molybdenum, or nickel, and oxides, nitrides, borides, and oxynitrides thereof. Other types and numbers of layers are also contemplated in the present disclosure.

At step 14, a polymer material may be applied to the razor blade cutting edge 72 to produce a coated blade edge 14*a* comprising a polymer coating 90. The polymer material may be applied as a dispersion of the polymer material in a dispersing medium. The polymer may be a polyfluorocarbon. In some examples, the polymer material is applied only once, such that the coated blade edge 14*a* consists of a single coating of polymer. As shown in FIG. 1B, the applied coating 90 may not be uniform.

The razor blade cutting edge 72 may then be heated in a first heating step 16 to adhere the coating 90 to the razor blade cutting edge 72 and produce blade edge 16*a*. The first heating step 16 may occur in two stages 16-1, 16-2. During a first stage 16-1, the razor blade cutting edge 72 may be heated to a temperature of 500° F.±50° F. and may be held at the temperature for 40 seconds for a single-edge blade (i.e., a blade with a single cutting edge) and 80 seconds for a double-edge blade (i.e., a blade with two cutting edges). Then, during a second stage 16-2, the razor blade cutting edge 72 may be heated to a temperature of 700° F.±50° F. or 745° F.±50° F. and may be held at the temperature for 40 seconds for a single-edge blade and 80 seconds for a double-edge blade to allow for adhesion of the coating 90 to the razor blade cutting edge.

In general, when the polymer coating 90 comprises a polyfluorocarbon, the heating temperature should be at least 620° F. so that it is above the melting temperature of the polyfluorocarbon in the polymer coating 90. Exceeding the melting point of the polyfluorocarbon in the polymer coating 90 improves contact between the coating 90 and the underlying layer, e.g., the overcoat layer 80, of the razor blade cutting edge 72, which drives bonding between the two coatings 80, 90 and increases the adhesion and durability of the polymer coating 90. Heating may also help to drive off components of the dispersing medium in which the polymer material is mixed, as discussed below. The heating temperature generally should not exceed about 770° F., as the polyfluorocarbon in the polymer coating 90 may begin to decompose at that temperature.

Following the first heating step 16 and prior to performing an additional heating step, the razor blade cutting edge 72 may optionally be cooled to room temperature, i.e., 68° F. to 77° F., at step 18 to produce a blade edge 18*a*. Cooling may help to ensure that the blade edge 18*a* has a similar temperature profile (as compared to the blade edge 14*a*) prior to undergoing additional heating.

The razor blade cutting edge 72 may be heated a second time in a second heating step 20 to produce a blade edge 20*a*. Similar to the first heating step 16, the second heating step may occur in two stages 20-1, 20-2. During a first stage 20-1, the razor blade cutting edge 72 may be heated to a temperature of 500° F.±50° F. and may be held at the temperature for 40 seconds for a singleedge blade and 80 seconds for a double-edge blade. Then, during a second stage 20-2, the razor blade cutting edge 72 may be heated to a temperature of 700° F.±50° F. or 745° F.±50° F. and may be held at the temperature for 40 seconds for a single-edge blade and 80 seconds for a double-edge blade. It has been demonstrated that performing the second heating step 20 further increases the bonding and adhesion of the polymer coating 90 and yields improved durability of the polymer coating 90.

Following the second heating step 20, the razor blade cutting edge 72 may optionally be cooled to room temperature at step 21 to produce a blade edge 21*a*. After the heating steps 16, 20, the razor blade cutting edge 72 may undergo a post-application treatment at step 22 to partially remove the polymer coating 90 and produce a final blade edge 22*a* with a uniform coating 100 at step 24. The treatment may be with a solvent and/or a mechanical process. The solvent may be perfluoroperhydrophenanthrene ($C_{14}F_{24}$). The treatment time may be adjusted as needed to remove more or less of the polymer coating 90. In some examples, the razor blade cutting edge 72 may be treated with the solvent for 2 minutes. The mechanical treatment process may be, for example, isostatic pressing. No additional application of the polymer material or thinning of the polymer coating occurs between the first and second heating steps 16 and 20 or between any of the heating stages 16-1, 16-2 and 20-1, 20-2. The blade edge 22*a* may optionally be subjected to one or more additional post-application treatment steps (not shown) to remove any excess solvent. These steps are described in more detail below.

Figure 2A:
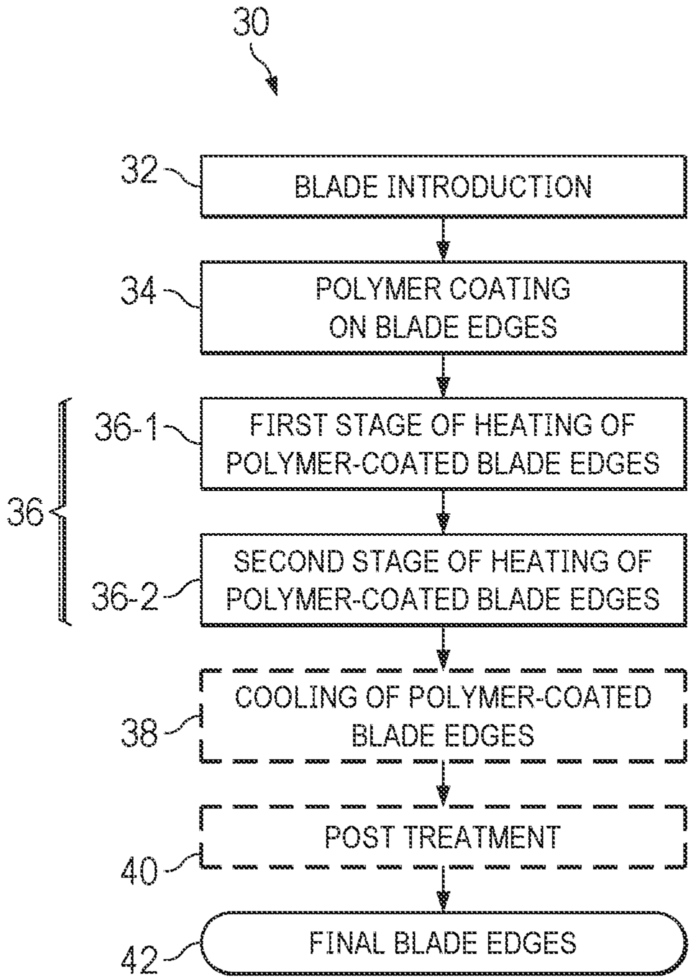
FIG. 2A is a schematic flow diagram of another process of manufacturing a razor blade cutting edge in accordance with the present disclosure.
Figure 2B:
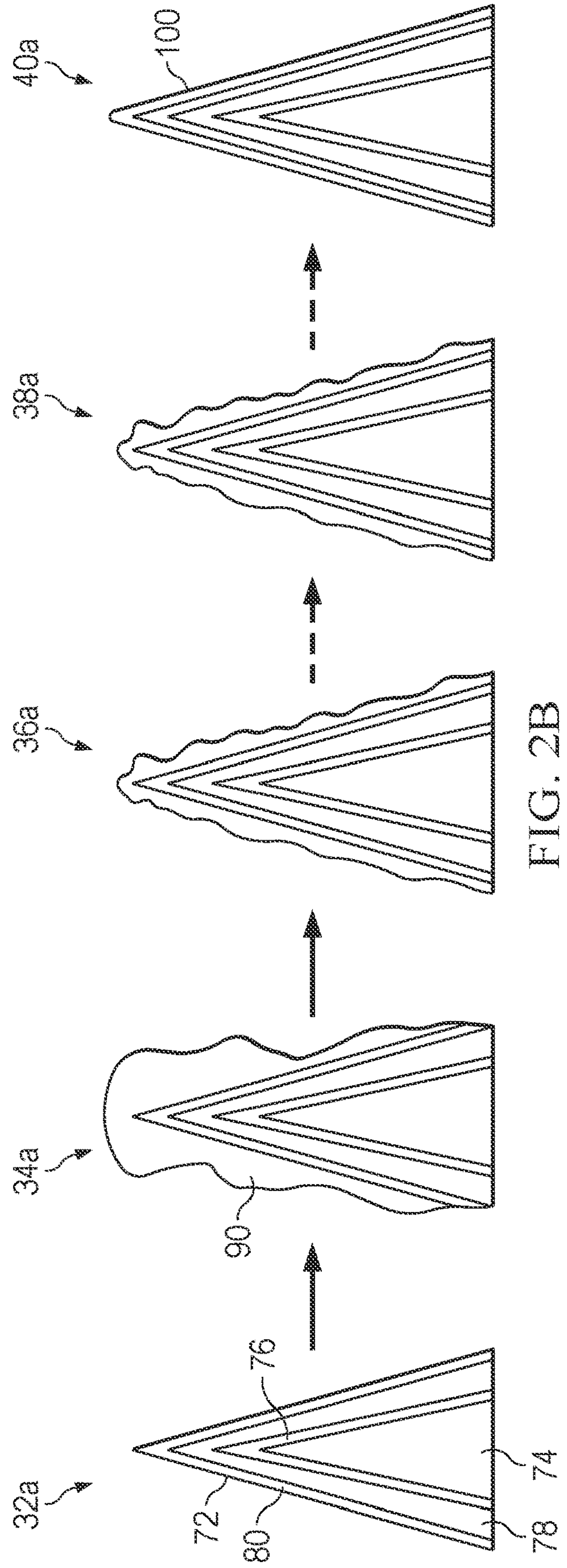
FIG. 2B is a graphical depiction of the blade cutting edges after each step of the flow diagram of FIG. 2A is performed.

FIGS. 2A and 2B are flow diagrams of another method 30 of manufacturing a razor blade cutting edge involving a single, dual-stage heating step with a higher temperature first stage. As used herein, the term "single" refers to a heating step that is performed continuously, in which the razor blade cutting edges are heated at a temperature above room temperature without any intervening steps, such as cooling, application of a polymer material, and/or removal of the polymer material. The single heating step may occur as a single stage or multiple stages. The method 30 may begin with introduction 32 of a razor blade cutting edge 72. As shown in FIG. 2B, the razor blade cutting edge 72 has a blade edge 32*a*, which may optionally comprise one or more prior coatings deposited thereon. The blade edge 32*a* may be substantially similar to the blade edge 12*a* in FIG. 1A and may comprise a substrate 74, an interlayer 76, a hard coating 78, and an overcoat layer 80.

At step 34, a polymer material, such as a polyfluorocarbon, may be applied to the razor blade cutting edge 72 to produce a coated blade edge 34*a* comprising a polymer coating 90. The polymer material may be applied as a dispersion of the polymer material in a dispersing medium. The polymer may be a polyfluorocarbon. In some examples, the polymer material is applied only once, such that the coated blade edge 34*a* consists of a single coating of polymer. As shown in FIG. 2B, the applied coating 90 may not be uniform.

The razor blade cutting edge 72 may then be heated in a single heating step 36 to adhere the coating 90 to the razor blade cutting edge 72 and produce blade edge 36*a*. The heating step 36 may occur in two stages 36-1, 36-2. During a first stage 36-1, the razor blade cutting edge 72 may be heated to a temperature of 600° F.±50° F. and may be held at the temperature for 40 seconds for a single-edge blade and 80 seconds for a double-edge blade. Then, during a second stage 16-2, the razor blade cutting edge 72 may be heated to a temperature of 745° F.±50° F. and may be held at the temperature for 40 seconds for a single-edge blade and 80 seconds for a double-edge blade to allow for adhesion of the coating 90 to the razor blade cutting edge. The temperature during the first stage 36-1 of the heating step 36 in FIG. 2A is higher than the temperature during the first stage 16-1, 20-1 of either heating step 16, 20 in FIG. 1A but is still below the temperature during the second stage 36-2 of the heating step 36. This increase in temperature during the first stage 36-1 increases the overall time that the razor blade cutting edge 72 is at a sufficiently high temperature to achieve additional bonding and adhesion of the polymer coating 90 and yields improved durability of the polymer coating 90.

In general, as discussed above, the heating temperature should be at least 620° F. when the polymer coating 90 comprises a polyfluorocarbon so that it is above the melting temperature of the polyfluorocarbon in the polymer coating 90. The heating temperature generally should not exceed about 770° F., as the polyfluorocarbon in the polymer coating 90 may begin to decompose at that temperature.

Following the heating step 36, the razor blade cutting edge 72 may optionally be cooled to room temperature, i.e., 68° F. to 77° F., at step 38 to produce a blade edge 38*a*.

After the heating step 36 or the optional cooling step 38, the razor blade cutting edge 72 may undergo a post application treatment at step 40 to partially remove the polymer coating 90 and produce a final blade edge 40*a* with a uniform coating 200 at step 42. The treatment may be with a solvent and/or a mechanical process. The solvent may be perfluoroperhydrophenanthrene ($C_{14}F_{24}$). The treatment time may be adjusted as needed to remove more or less of the polymer coating 90. In some examples, the razor blade cutting edge 72 may be treated with the solvent for 2 minutes. The mechanical treatment process may be, for example, isostatic pressing. The blade edge 40*a* may optionally be subjected to one or more additional post-application treatment steps (not shown) to remove any excess solvent, after which the method may conclude, i.e., no additional polymer is applied and no additional heating or thinning of the polymer coating is performed. These steps are described in more detail below.

Figure 3A:
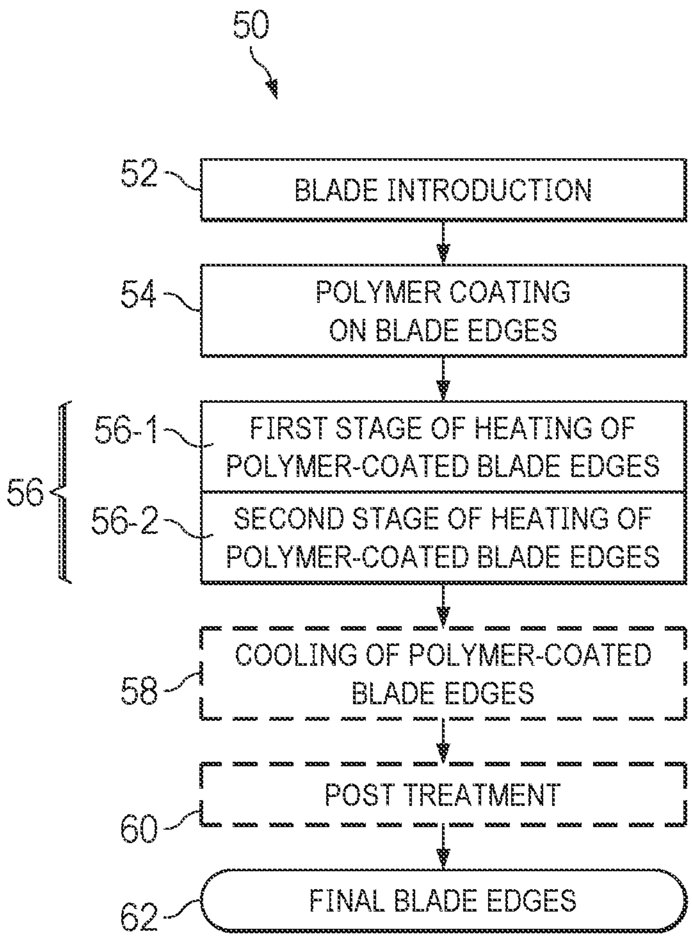
FIG. 3A is a schematic flow diagram of a further process of manufacturing a razor blade cutting edge in accordance with the present disclosure.
Figure 3B:
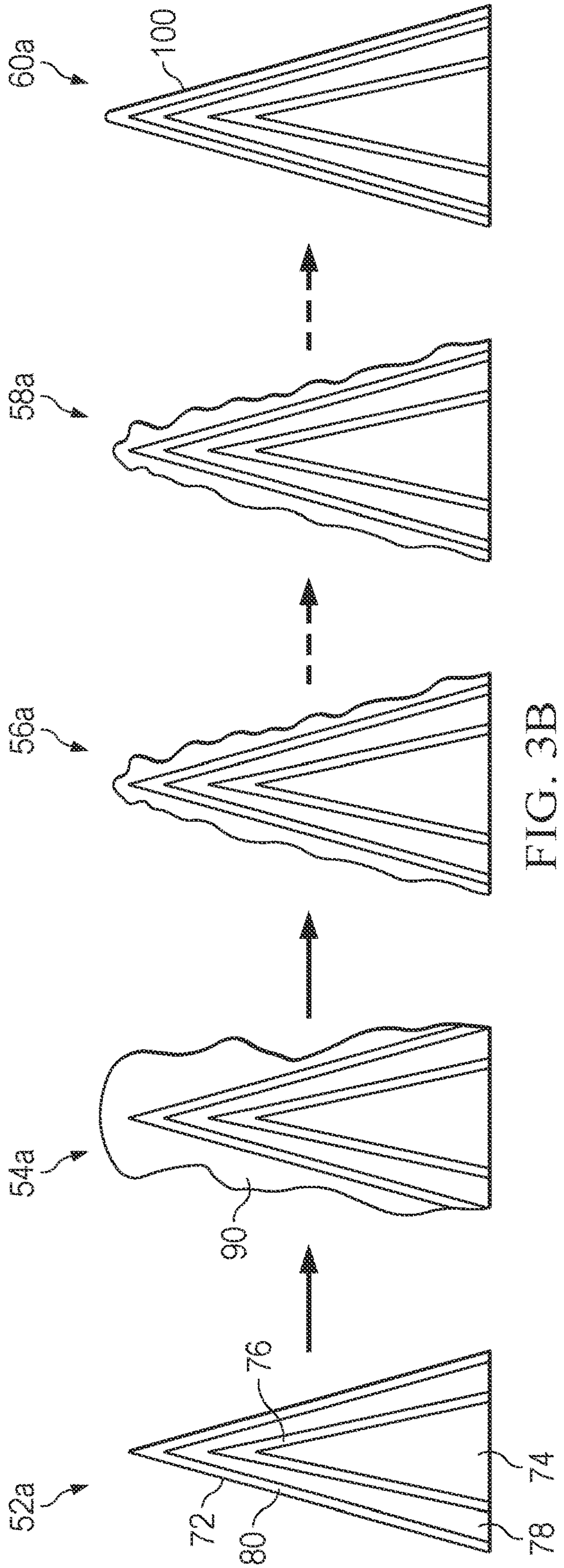
FIG. 3B is a graphical depiction of the blade cutting edges after each step of the flow diagram of FIG. 3A is performed.

FIGS. 3A and 3B are flow diagrams of a further method 50 of manufacturing a razor blade cutting edge involving a uniform heating temperature. The method 50 may begin with introduction 52 of a razor blade cutting edge 72. As shown in FIG. 3B, the razor blade cutting edge 72 has a blade edge 52*a*, which may optionally comprise one or more prior coatings deposited thereon. The blade edge 52*a* may be substantially similar to the blade edge 12*a* in FIG. 1A and may comprise a substrate 74, an interlayer 76, a hard coating 78, and an overcoat layer 80.

At step 54, a polymer material, such as a polyfluorocarbon, may be applied to the razor blade cutting edge 72 to produce a coated blade edge 54*a* comprising a polymer coating 90. The polymer material may be applied as a dispersion of the polymer material in a dispersing medium. The polymer may be a polyfluorocarbon. In some examples, the polymer material is applied only once, such that the coated blade edge 54*a* consists of a single coating of polymer. As shown in FIG. 3B, the applied coating 90 may not be uniform.

The razor blade cutting edge 72 may then be heated in a single heating step 56 to adhere the coating 90 to the razor blade cutting edge 72 and produce blade edge 56*a*. When the polymer coating 90 comprises a polyfluorocarbon, the razor blade cutting edge 72 may be heated to a temperature in the range of 625° F. to 750° F., preferably 700° F. The razor blade cutting edge 72 may be held at this temperature in the heating step 56 for a predefined time to allow for adhesion of the coating 90 to the razor blade cutting edge 72. In heating step 56, the razor blade cutting edge 72 may be held at the temperature for 80 seconds for a single-edge blade and 160 seconds for a double-edge blade. The heating step 56 may be considered to include two heating stages 56-1, 56-2, in which the temperature in the first stage 56-1 is the same as the temperature during the second stage 56-2. Increasing the temperature in the first stage 56-1 increases an overall time that the razor blade cutting edge 72 is at a sufficiently high temperature to achieve additional bonding and adhesion of the polymer coating 90 and yields improved durability of the polymer coating 90.

In general, as discussed above, the heating temperature should be at least 620° F. so that it is above the melting temperature of the polyfluorocarbon in the polymer coating 90. The heating temperature generally should not exceed about 770° F., as the polyfluorocarbon in the polymer coating 90 may begin to decompose at that temperature.

Following the heating step 56, the razor blade cutting edge 72 may optionally be cooled to room temperature, i.e., 68° F. to 77° F., at step 58 to produce a blade edge 58*a*.

After the heating step 56 or the optional cooling step 58, the razor blade cutting edge 72 may undergo a post-application treatment at step 60 to partially remove the polymer coating 90 and produce a final blade edge 60*a* with a uniform coating 300 at step 62. The treatment may be with a solvent and/or a mechanical process. The solvent may be perfluoroperhydrophenanthrene ($C_{14}F_{24}$). The treatment time may be adjusted as needed to remove more or less of the polymer coating 90. In some examples, the razor blade cutting edge 72 may be treated with the solvent for 2 minutes. The mechanical treatment process may be, for example, isostatic pressing. The blade edge 60*a* may optionally be subjected to one or more additional post-application treatment steps (not shown) to remove any excess solvent. These steps are described in more detail below.

Sintering thermal gradients can be customized for specific combinations of blade edge profiles (e.g., a shape of the blade edge, including a number of facets, tip radius, facet angle(s), etc.) and/or hard coatings to optimize the durability or other properties of the PTFE coating. Different hard coating outer layers may exhibit different reactivity and/or bonding characteristics with the polymer coating, thus requiring the implementation of specific sintering temperature profiles to deliver desired blade design intent. For example, an outer coating layer comprising chromium diboride may require heating at relatively cooler temperature (s) for a time period to obtain optimal properties, while a chromium outer coating layer over a DLC hard coating layer may require heating at relatively hotter temperature(s) for a similar time period. A method of manufacturing a razor blade cutting edge may include applying a single coating of a polymer material to the razor blade cutting edge to form a coated blade edge, as described above with respect to methods 10, 30, and 50 and shown in FIGS. 1A, 2A, and 3A, and selecting a temperature profile, in which the temperature profile comprises at least one temperature and at least one time, and in which the temperature profile is selected based on a composition of the razor blade cutting edge. For example, the temperature profile may include the time and/or temperature described with respect to steps 16-20 in method 10, step 36 in method 30, or step 56 in method 50. The coated blade edge is then heated at the temperature and for the time indicated by the selected temperature profile to adhere the polymer material to the razor blade cutting edge, followed by optional treatment with a solvent or a mechanical process to partially remove the coating, as described herein.

Figure 4:
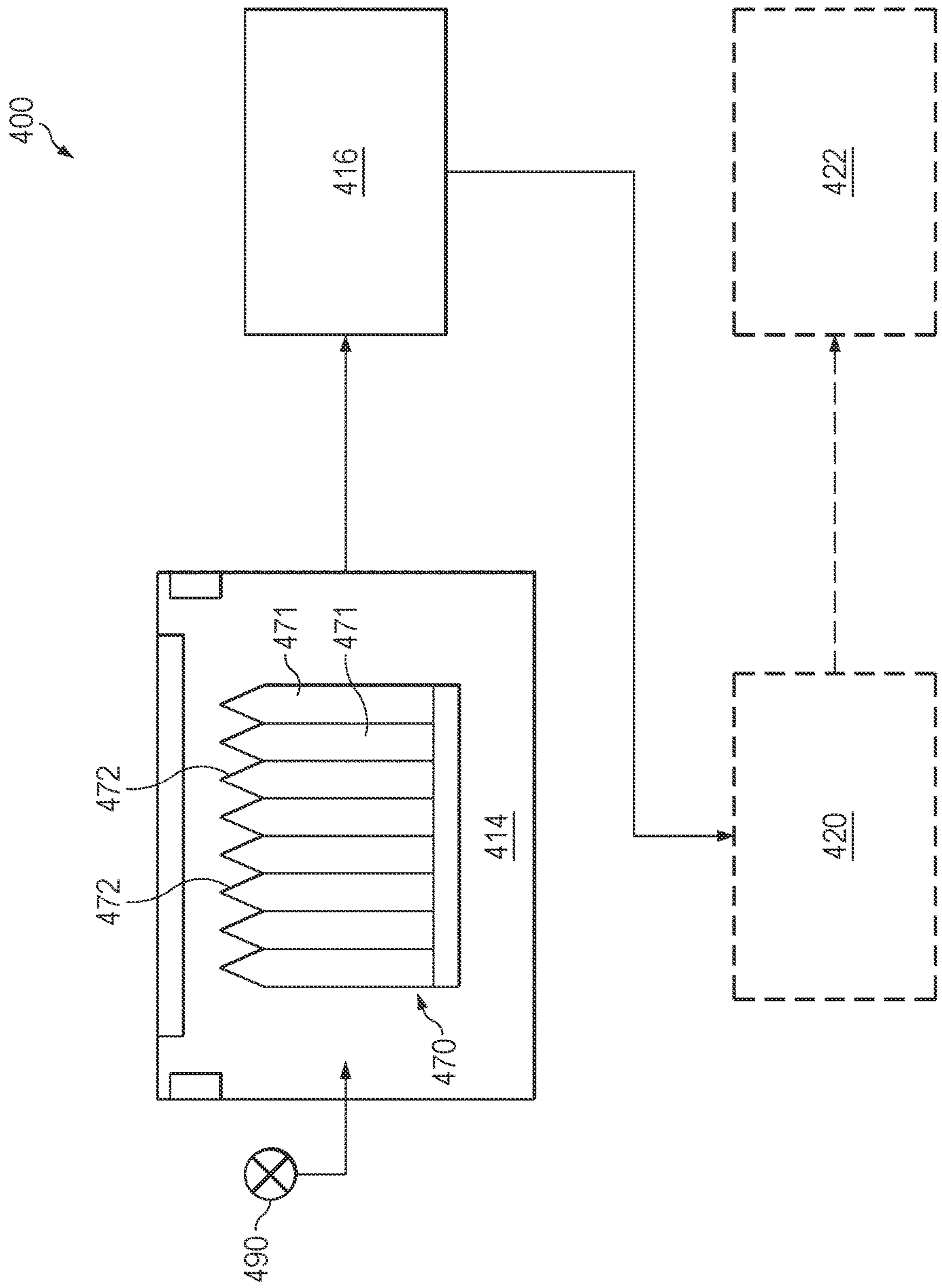
FIG. 4 is a schematic of a chamber showing razor blades capable of being coated via a deposition technique in accordance with the present disclosure.

FIG. 4 is a block flow diagram of a system 400 that may be used to manufacture treated razor blades in accordance with the present disclosure. A coating chamber 414 may be used to apply one or more coatings of a coating material 490 to one or more portions of a plurality of razor blades 470, such as cutting edges 472 of the razor blades 470. As shown, the razor blade(s) 470 may be positioned within the chamber 414 for application of the coating material 490 using one or more techniques described in detail below. The system 400 may comprise a chamber for a first heating step 416 and may optionally comprise a chamber for a second heating step 420, as described below. The system 400 may also optionally comprise an additional chamber 422 for performing different coating techniques and/or to perform different post-application treatments.

Applying the Coating Material

According to the present disclosure, the coating material 490 may comprise a polymer material and may comprise a dispersion of the polymer material in a dispersing medium. The polymer material may be a fluorocarbon polymer (also referred to herein as a polyfluorocarbon). The preferred fluorocarbon polymers (i.e., starting materials) may contain a chain of carbon atoms including a preponderance of —$CF_2$—$CF_2$— groups, such as polymers of tetrafluoroethylene, including copolymers such as those with a minor proportion, e.g., up to 5% by weight of hexafluoropropylene. These polymers may have terminal groups at the ends of the carbon chains, which may vary in nature, depending, as is well known, upon the method of making the polymer. Among the common terminal groups of such polymers are: —H, —COOH, —Cl, —$CCl_3$, —$CFClCF_2Cl$, —$CH_2OH$, —$CH_3$ and the like. The preferred polymers of the present disclosure may have average molecular weights ranging from about 700 to about 4,000,000 grams/mole, and preferably from about 22,000 to about 200,000 grams/mole.

The most preferred fluorocarbon polymer (i.e., starting material) is polytetrafluoroethylene (PTFE). The coating step 14, 34, 54 in FIGS. 1A, 2A, and 3A may utilize PTFE with an average molecular weight of from greater than about 200,000 to about 4,000,000 grams/mole. Alternatively, the PTFE of coating step 14, 34, 54 may have an average molecular weight of from about 3,000 to about 200,000 grams/mole.

Additionally, the present disclosure contemplates that the resultant polyfluorocarbon coating after one or more of heating steps 16, 20, 36, 56 in FIGS. 1A, 2A, and 3A may include PTFE with a resultant thickness of less than about 0.5 micrometers.

In an alternate embodiment, the present disclosure contemplates that the resultant polyfluorocarbon coating after one or more of heating steps 16, 20, 36, 56 may include PTFE with a resultant thickness greater than about 0.5 micrometers, more preferably near or greater than about 1.0 micrometer. In particular, the heated polyfluorocarbon coating being significantly thicker than prior art polyfluorocarbon coatings (e.g., U.S. Pat. No. 5,985,459) have specific applications where skin comfort and/or cutting force reduction with use may be desired.

As discussed below, the coating in accordance with the present disclosure may be solvent treated at step 22, 40, 60 in FIGS. 1A, 2A, and 3A, further enhancing the shave characteristics such as reducing the cutting force. Additionally, the present disclosure contemplates that the resultant polyfluorocarbon coating after step 22, 40, 60 may include PTFE with a resultant thickness of less than or equal to about 0.2 micrometers.

The preferred commercial polyfluorocarbons may include materials manufactured by Chemours™ such as Chemours™ Zonyl® fluoroadditive powders and/or dispersions (e.g., MP1100, MP1200, MP1600, and MPD1700) or Chemours™ DryFilm® dispersions, such as LW-2120 or the RA series.

Polyfluorocarbon dispersions according to the present disclosure may comprise from 0.05 to 10% (wt) polyfluorocarbon, preferably from 0.5 to 2% (wt), dispersed in a dispersant media. The polymer dispersion may be introduced into the flow stream directly or a polymer powder may be mixed into a dispersing medium and then homogenized prior to being introduced into the flow stream. For the purpose of forming the dispersion to be sprayed onto the cutting edges 472, the polyfluorocarbon should have a very small submicron particle size. Dispersing medium is typically selected from the group consisting of fluorocarbons (e.g., Freon brand from Chemours™), water, volatile organic compounds (e.g., isopropyl alcohol), and supercritical $CO_2$. Water is most preferred.

The dispersion may be applied to the cutting edges 472 in any suitable manner to give as uniform a coating as possible, such as, for example, spraying, dipping, brushing, isostatic pressing, molding, vacuum deposition, printing, application via a pad or paint, ink-jet nozzle, 3D printing, or any combination thereof, any of which may or may not include masking one or more portions of the razor blades 470. Spraying is especially preferred for coating the cutting edges 472, in which case an electrostatic field may be employed in conjunction with the spray in order to increase the efficiency of deposition. Preheating of the dispersion may be desirable to facilitate spraying, with the extent of preheating depending on the nature of the dispersion. Preheating of the blades 470 to a temperature near or greater than the boiling point of the dispersant media may also be desirable.

Heating and Cooling

With reference to FIG. 4, the heating chamber 416 may be used to heat the coated razor blades carried on a chain (not shown). The chamber 416 may be heated to a set temperature and the coated blades remain in the chamber 416 for a set time. Specifically, the time in the chamber 416 may be determined, at least in part, by a length of the chamber 416 and a speed of the chain. The coated blades may then optionally be cooled to room temperature in a separate chamber (not shown). In the case of methods involving multiple heating steps and/or stages as described herein, the coated blades may optionally be placed in the second heating chamber 420, which may be heated to a set temperature and the coated blades remain in the chamber 420 for a set time. Alternatively, some or all heating steps and/or stages may be performed in the first heating chamber 416. An additional cooling step may then be performed in a separate chamber (not shown).

In general, the blades carrying the deposited polymer particles on their cutting edges should be heated at an elevated temperature to form an adherent coating on the cutting edge and to drive off the dispersant media. It is preferred that the coated blades are heated in an atmosphere of inert gas such as helium, argon, nitrogen, etc., or in an atmosphere of reducing gas such as hydrogen, or in mixtures of such gases, or in vacuum. The heating must be sufficient to permit the individual particles of polymer to, at least, sinter. Preferably, the heating should be sufficient to permit the polymer to spread into a substantially continuous film of the proper thickness and to cause the polymer to become firmly adherent to the blade edge material.

Thus, the heating of the coating at steps 16, 20, 36, 56 in FIGS. 1A, 2A, and 3A is intended to cause the polymer to adhere to the blade. The heating operation may result in a sintered, partially melted, or fully melted coating. A partially melted or totally melted coating is preferred as it allows the coating to spread and cover the blade more thoroughly. For more detailed discussions of melt, partial melt, and sinter, see McGraw-Hill Encyclopedia of Science and Technology, Vol. 12, 5th edition, pg. 437 (1992). The heating conditions, i.e., maximum temperature, length of time, etc., should generally be adjusted so as to avoid substantial decomposition of the polymer and/or excessive tempering of the metal of the cutting edge.

Post-Application Treatment

After heating, the coated blades may optionally be treated in a post-treatment chamber 422, as shown in FIG. 4. The treatment may be with a solvent and/or a mechanical process. The solvent treatment partially removes the polyfluorocarbon coating that was initially deposited and heated on the blade edge surface. The portion of the polyfluorocarbon coating that is removed may generally be referred to as being "non-adherent" soluble polymer molecules of the coating. Solvents are generally selected based on their polyfluorocarbon solvency, being a liquid at a dissolution temperature, and/or having low polarity. These parameters are described in U.S. Pat. No. 5,985,459. After the blade edges have been solvent-treated as discussed above, the blades may be additionally treated to remove any excess solvent. This treatment may be performed by, for example, dipping the blade edge into a wash solution for the solvent. Preferably the wash solution should be easily separable from the solvent. Alternatively, the coated blades may be treated with a mechanical process, such as isostatic pressing.

Figure 5:
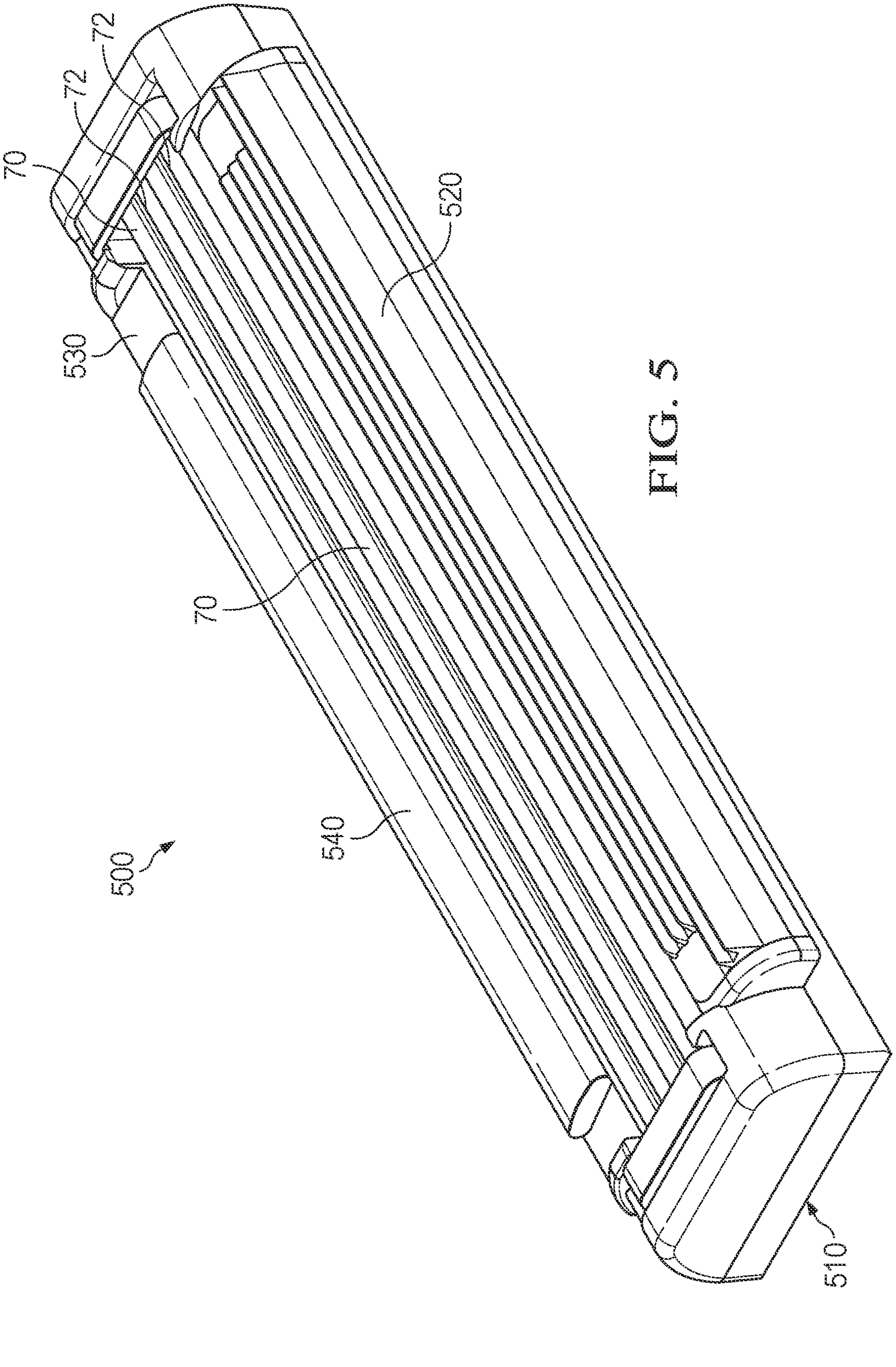
FIG. 5 is a perspective view of a razor cartridge comprising the razor blade edges with a uniform coating in accordance with the present disclosure.

With reference to FIG. 5, one or more razor blades 70 comprising a razor blade edge 72 with a uniform coating in accordance with the present disclosure may be incorporated into a razor cartridge 500, which may include a housing 510 with a guard structure 520 and a cap structure 530. The cap structure 530 may comprise a shaving aid 540 in the form of one or more lubricating and/or moisturizing strips. The razor cartridge 500 may be used integrally with a handle in a disposable razor in which the complete razor is discarded as a whole unit when the blade or blades become dulled, or may comprise a detachable razor cartridge that forms part of a shaving system, in which the detachable razor cartridge is uncoupled from a razor handle and disposed of and a new detachable razor cartridge is coupled to the same handle.

Blade Preparation Example—Uniform Temperature Sintering

A batch of blades was spray coated, heated, and solvent-treated as follows:

1. A fixture holding the blades was set on a carrier. The fixture was passed through a chamber where the blade edges were spray coated with an aqueous dispersion of a fluorocarbon.
2. The fixture then was passed through a heating chamber for a heating step comprised of two stages, where each stage had a temperature set to 700° F.
3. The blade edges were then solvent treated at greater than about 500° F. for about 2 minutes at a pressure at or above about 60 PSI in perfluoroperhydrophenanthrene.
4. Blade samples were collected.

Figure 6:
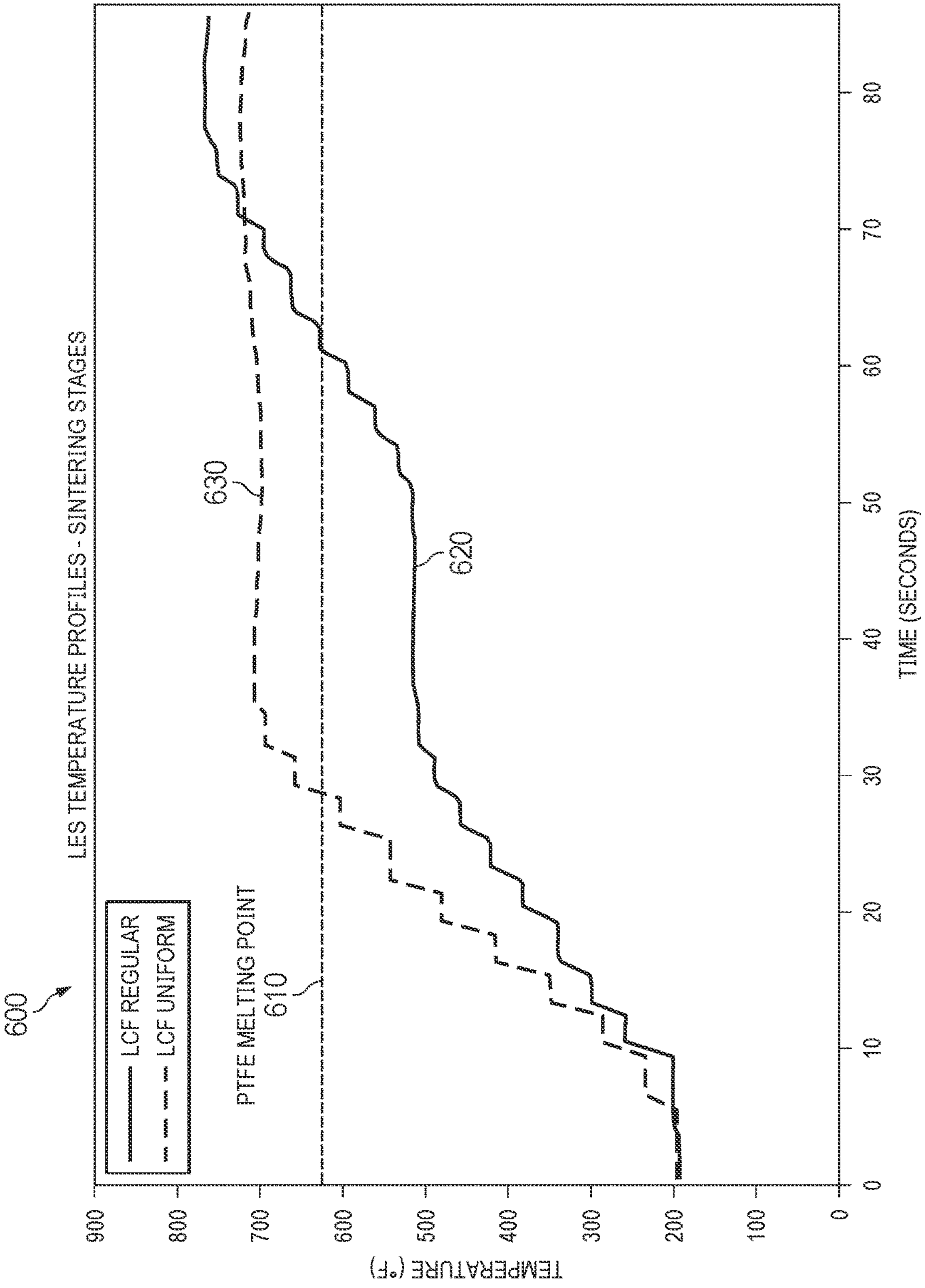
FIG. 6 is a graphical plot of the temperature of the razor blade edges during the sintering process of FIGS. 2A and 3A.

FIG. 6 provides a graph 600 of the time at temperature for blades prepared using the example method above (labeled Low Cutting Force (LCF) Uniform, 630) as compared to blades prepared using a sintering process where the first heating stage of the heating chamber was set to 500° F. and the second heating stage of the heating chamber was set to above 700° F. (labeled LCF Regular, 620). As shown in FIG. 6, the manufacturing process described above increases the time at the required sintering temperature. Specifically, the temperature profiles show that the LCF Uniform blades 630 made using the Uniform Temperature sintering process are held at a temperature greater than the melting point of the PTFE dispersion (about 620° F., 610) for approximately 30 more seconds than the LCF Regular blades 620 made using the regular sintering process.

The Uniform Temperature process of the present invention results in increased durability. In particular, it is believed that the improved coating durability and overall blade performance of coated blades in accordance with the present disclosure can be attributed, at least in part, to ensuring that the blades are at a target processing temperature, i.e., a temperature at or above a melting point of the coating material, for a sufficient amount of time to allow sufficient adhesion between the coating and the underlying layer.

As shown in FIG. 6, LCF Regular coated blades 620 reach temperatures at or near the target processing temperature at the end of the process shortly before exiting the sintering chamber, such that the coated blades are at or near the target temperature for only a short period of time. As time at temperature is believed to be critical for achieving a strong bond between the coating and the underlying layer, the presently disclosed processes provide improved blade properties and performance. Simply increasing the processing temperature may cause the coating to degrade and can increase blade tempering and reduce edge strength. The presently disclosed processes involve heating for a longer time at a lower temperature and/or heating at higher temperatures in stages, both of which may reduce blade tempering and produce a more robust blade edge that is less susceptible to edge breakdown. In addition, the processes disclosed herein do not require a second polyfluorocarbon coating, nor do they require a second treatment step to partially remove the second polyfluorocarbon coating, which saves material and time. The processes in accordance with the present disclosure involve two heating stages that are performed sequentially without any intervening steps, e.g., no additional coating or thinning steps. Additionally, the final razor blade cutting edges have enhanced durability which results in an improved and more consistent shaving performance.

TESTING

Testing was performed to determine how the durability of blades prepared in accordance with the inventive methods of the present disclosure compares to blades prepared in accordance with a standard control production method and an alternative production method, both latter methods known in the art. Comparative blade samples (Samples 1 and 2) were prepared using various production methods listed below in Table 1. The inventive blade samples (Samples 3 and 4) were made using the inventive methods of the present disclosure noted below, with the Sample 4 blade being prepared using a process (Uniform Temperature, UT) where the first and second heating stages occurred at about 745° F.

Both the inventive and comparative blade samples were prepared using a sharpened steel substrate with a Nb/DLC/Cr hard coating.

TABLE 1

| Comparative Blade Production Methods | |
|---|---|
| Sample No. | Production Method |
| Sample 1 (Comparative) | Standard Sinter/Thin Uniform Telomer (TUT)[1] |
| Sample 2 (Comparative) | Respray/Sinter/Thin Uniform Telomer (RSST)[2] |
| Sample 3 (Inventive) | Resinter/Thin Uniform Telomer (RST)[3] |
| Sample 4 (Inventive) | Uniform Temperature/Thin Uniform Telomer (UT)[4] |

[1]Described in U.S. Pat. No. 5,985,459

[2]Described in U.S. Pat. No. 10,118,304

[3]Described herein with respect to FIGS. 1A and 1B.

[4]Described herein with respect to FIGS. 3A and 3B.

Figure 7A:
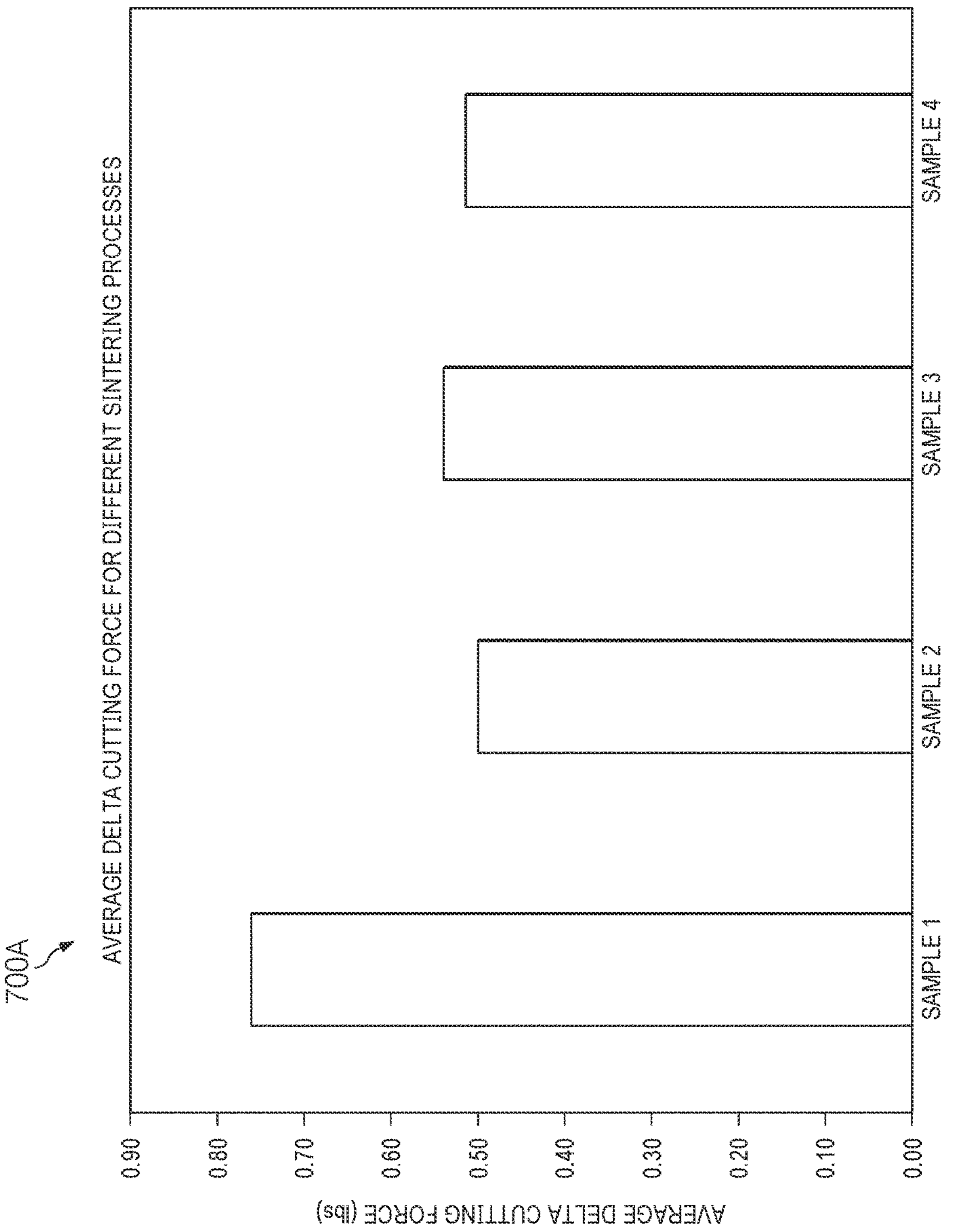
FIGS. 7A and 7B are graphical plots of the average delta cutting force of various blade examples.

The blades were tested to determine the durability of the coatings, specifically comparing the cutting force of the blades before ($CF_{Before}$) and after ($CF_{After}$) 500 cuts, with the cutting force being indicated in pounds (lbs) of cut force in wool felt. The difference in the blade cutting force before and after 500 wool felt cuts, $CF_{After}-CF_{Before}$, is defined as the delta cutting force, and generally the lower the delta cutting force the greater the durability of the fluorocarbon coating (e.g., PTFE telomer). FIG. 7A is a graph 700A of the average delta cutting force values for each set of blades. As shown in FIG. 7A and listed in Table 2, the RST process and the single-pass UT sintering process used to prepare the Sample 3 and 4 blades provided a greater durability and lower delta cutting forces, as compared to the Sample 1 blades. The Sample 3 and 4 blades demonstrated a durability similar to the durability of the Sample 2 blades prepared using the more complex RSST process. In particular, the RST and UT processes eliminate the need for the additional processing involved with the second application of the polyfluorocarbon coating in the RSST process, which may reduce cost and production time while still providing similar durability.

TABLE 2

| Delta Cutting Force (lbs) Values ($CF_{After}$ − $CF_{Before}$) for Different Sintering Processes | | | | |
|---|---|---|---|---|
| | Sample 1 | Sample 2 | Sample 3 | Sample 4 |
| | 0.64 | 0.53 | 0.51 | 0.48 |
| | 0.92 | 0.41 | 0.60 | 0.65 |
| | 0.89 | 0.40 | 0.53 | 0.45 |
| | 0.73 | 0.46 | 0.55 | 0.61 |
| | 0.71 | 0.68 | 0.45 | 0.39 |
| | 0.70 | 0.54 | 0.59 | 0.49 |
| Average: | 0.77 | 0.50 | 0.54 | 0.51 |

Additional testing was performed on chromium diboride-coated blades prepared using the Uniform Temperature method (described above with respect to FIGS. 3A and 3B), where the sintering process occurred at different temperatures laid out in Table 3 below. The blades were then subjected to similar durability testing described above.

TABLE 3

| Comparative Blade Sintering Temperatures | |
|---|---|
| Sample No. | Uniform Sintering Temperature (° F.) |
| Sample 5 | 675 |
| Sample 6 | 700 |
| Sample 7 | 720 |
| Sample 8 | 745 |

Figure 7B:
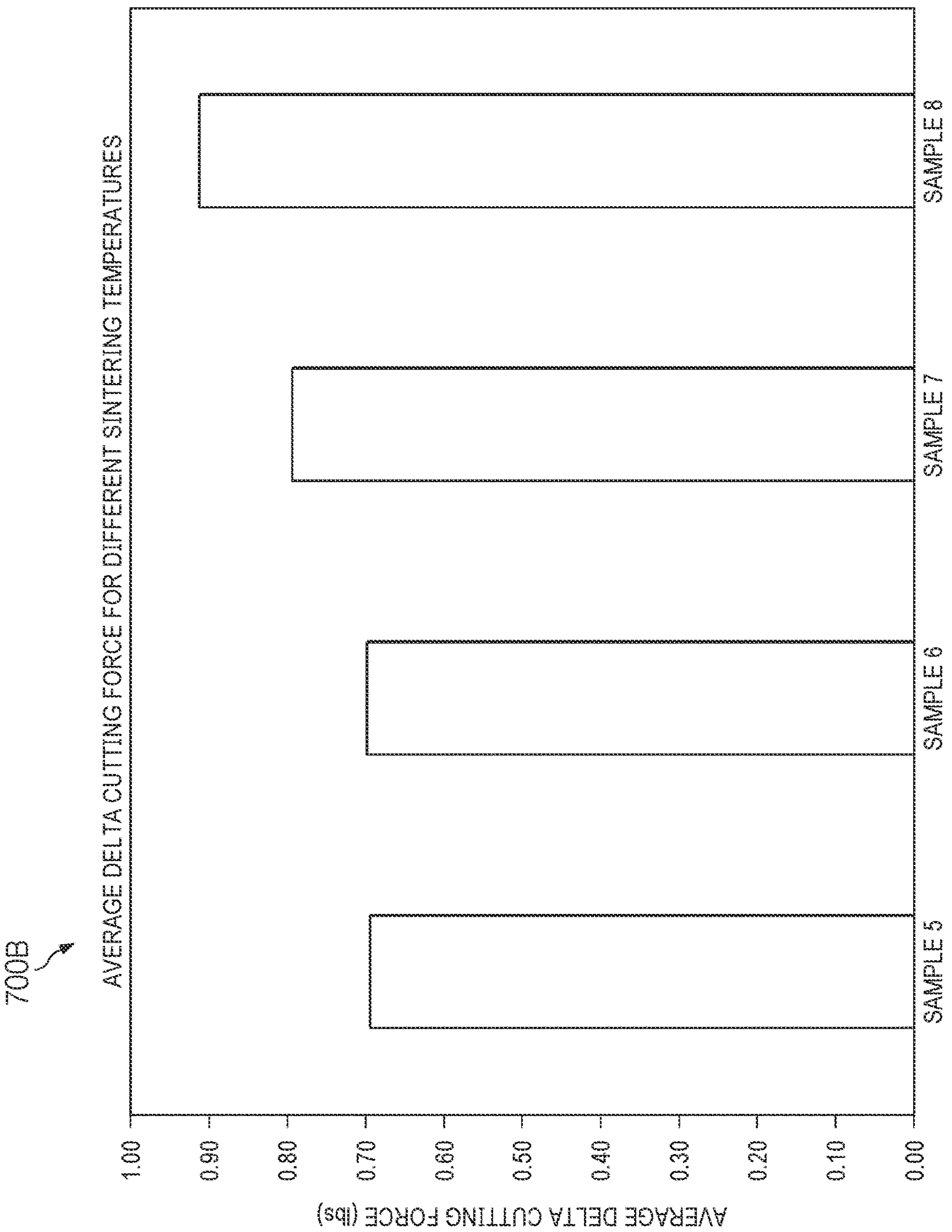

FIG. 7B is a graph 700B of the average delta cutting force values ($CF_{After}-CF_{Before}$) for each set of blades. As shown in FIG. 7B and listed in Table 4, the lower temperature sintering processes (Samples 5 and 6) have better durability for $CrB_2$-coated blades than the high temperature sintering processes (Samples 7 and 8). As noted above, generally the lower the delta cutting force the greater the durability of the fluorocarbon coating. Hence, durability appears to decrease when the sintering process temperature is increased. Thus, the sintering temperature profiles can be optimized for a specific blade/coating type.

TABLE 4

| Delta Cutting Force (lbs) Values for Different Sintering Temperatures | | | | |
|---|---|---|---|---|
| | Sample 5 | Sample 6 | Sample 7 | Sample 8 |
| | 0.69 | 0.67 | 0.86 | 0.94 |
| | 0.73 | 0.75 | 0.83 | 0.99 |
| | 0.72 | 0.67 | 0.78 | 0.91 |
| | 0.63 | 0.70 | 0.77 | 0.88 |
| | 0.71 | 0.75 | 0.75 | 0.85 |
| | 0.69 | 0.66 | 0.77 | 0.91 |
| Average: | 0.70 | 0.70 | 0.79 | 0.91 |

Representative embodiments of the present disclosure described above can be described as follows:

A. A method of manufacturing a razor blade cutting edge, the method comprising:

applying a single coating of a polymer material to the razor blade cutting edge to form a polymer coated razor blade cutting edge;

selecting a temperature profile, wherein the temperature profile comprises at least one temperature and at least one time, and wherein the temperature profile is selected based on a composition of the razor blade cutting edge;

and heating the polymer coated razor blade cutting edge at the temperature and for the time indicated by the selected temperature profile to adhere the polymer material to the razor blade cutting edge.

B. The method of paragraph A, wherein the temperature profile is further selected based on a blade edge profile.

C. The method of paragraphs A or B, wherein the razor blade cutting edge comprises a substrate and no layers of material or one or more layers of material disposed between the substrate and the polymer material.

D. The method of paragraph C, wherein the one or more layers of material comprises a chromium-containing material, a carbon-containing material, or any combination thereof.

E. The method of paragraph D, wherein the chromium-containing material comprises chromium diboride.

F. The method of any of paragraphs A to E, wherein heating the coated blade edge comprises:

performing a first heating of the coated blade edge comprising a first adhesion step to adhere the polymer material to the razor blade cutting edge; and performing a second heating of the coated blade edge comprising a second adhesion step to adhere the polymer material to the razor blade cutting edge, wherein the first heating of the coated blade edge comprises a first heating stage and a second heating stage, and wherein the second heating of the coated blade edge comprises a first heating stage and a second heating stage.

G. The method of any of paragraphs A to E, wherein heating the coated blade edge comprises:

performing a single heating of the coated blade edge to adhere the polymer material to the razor blade cutting edge, wherein the single heating of the coated blade edge comprises a first heating stage and a second heating stage.

H. The method of any of paragraphs A to E, wherein heating the coated blade edge comprises:

performing a single heating of the coated blade edge at a temperature of between 620° F. and 795° F. to adhere the polymer material to the razor blade cutting edge.

I. The method of any of paragraphs A to H, wherein heating the coated blade edge comprises:

performing a single heating of the coated blade edge for a time of at least 40 seconds to adhere the polymer material to the razor blade cutting edge.

J. The method of any of paragraphs A to I, further comprising treating the coated blade edge with a solvent or a mechanical process to partially remove the coating.

The illustrations presented herein are not intended to be actual views of any particular substrate, apparatus (e.g., device, system, etc.), or method, but are merely idealized and/or schematic representations that are employed to describe and illustrate various embodiments of the disclosure.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" or ±10% of the disclosed dimension.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of manufacturing a razor blade cutting edge, the method comprising:

applying a single coating of a polymer material to the razor blade cutting edge to form a polymer coated razor blade cutting edge;

selecting a temperature profile, wherein the temperature profile comprises at least one temperature and at least one time, and wherein the temperature profile is selected based on a composition of the razor blade cutting edge;

heating the polymer coated razor blade cutting edge at the temperature and for the time indicated by the selected temperature profile to adhere the polymer material to the razor blade cutting edge;

cooling the polymer coated razor blade cutting edge to a temperature between 68 and 77 degrees Fahrenheit;

performing a second heating of the coated blade edge comprising a second adhesion step to adhere the polymer material to the razor blade cutting edge, wherein the first heating of the coated blade edge comprises a first heating stage and a second heating stage, and wherein the second heating of the coated blade edge comprises a first heating stage and a second heating stage.

2. The method of claim 1, wherein the temperature profile is further selected based on a blade edge profile.

3. The method of claim 1, wherein the razor blade cutting edge comprises a substrate and no layers of material or one or more layers of material disposed between the substrate and the polymer material.

4. The method of claim 3, wherein the one or more layers of material comprise a chromium-containing material, a carbon-containing material, or any combination thereof.

5. The method of claim 4, wherein the chromium-containing material comprises chromium diboride.

6. The method of claim 1, wherein heating the coated blade edge comprises:

performing a first heating of the coated blade edge comprising a first adhesion step to adhere the polymer material to the razor blade cutting edge.

7. The method of claim 1, wherein heating the coated blade edge comprises:

performing a single heating of the coated blade edge to adhere the polymer material to the razor blade cutting edge, wherein the single heating of the coated blade edge comprises a first heating stage and a second heating stage.

8. The method of claim 1, wherein heating the coated blade edge comprises:

performing a single heating of the coated blade edge at a temperature of between 620° F. and 795° F. to adhere the polymer material to the razor blade cutting edge.

9. The method of claim 1, wherein heating the coated blade edge comprises:

performing a single heating of the coated blade edge for a time of at least 40 seconds to adhere the polymer material to the razor blade cutting edge.

10. The method of claim 1, further comprising treating the coated blade edge with a solvent or a mechanical process to partially remove the coating.

* * * * *